United States Patent
Vogt et al.

(10) Patent No.: US 6,587,138 B1
(45) Date of Patent: Jul. 1, 2003

(54) METHOD AND DEVICE FOR INCORPORATING ADVERTISING INTO VIDEOTELEPHONE COMMUNICATIONS

(75) Inventors: Oliver Vogt, Hannover (DE); Frieder Mundt, Neumuenster (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/744,442
(22) PCT Filed: May 25, 2000
(86) PCT No.: PCT/DE00/01704
§ 371 (c)(1), (2), (4) Date: Jan. 22, 2001
(87) PCT Pub. No.: WO00/74379
PCT Pub. Date: Dec. 7, 2000

(30) Foreign Application Priority Data

May 28, 1999 (DE) ......................................... 199 24 663

(51) Int. Cl.⁷ ................................................ H04N 7/14
(52) U.S. Cl. ............................. 348/14.12; 348/14.01; 379/93.12; 379/93.25; 379/201.01
(58) Field of Search .......................... 379/93.12, 93.17, 379/93.25, 93.22, 201.01, 114.13, 88.25, 88.2; 705/27; 348/14.01, 14.03, 14.05, 14.07, 14.08, 14.12

(56) References Cited

U.S. PATENT DOCUMENTS

| | | | |
|---|---|---|---|
| 5,448,625 A | * 9/1995 | Lederman | |
| 5,450,123 A | * 9/1995 | Smith | 348/17 |
| 5,610,653 A | 3/1997 | Abecassis | |
| 5,757,781 A | * 5/1998 | Gilman et al. | 348/15 |
| 5,835,130 A | 11/1998 | Read | |
| 5,880,770 A | * 3/1999 | Ilcisin et al. | 348/14 |
| 5,907,321 A | 5/1999 | Grossman | |
| 6,084,628 A | * 7/2000 | Sawyer | 348/14.01 |

* cited by examiner

Primary Examiner—Wing Chan
(74) Attorney, Agent, or Firm—Michael J. Striker

(57) ABSTRACT

In the inventive video telephony method a server of a selected service provider controls transmission of regular video information and voice information between terminals of a caller and a called subscriber during a video telephone call. The server issues a request to the caller to carry out an interactive action during a predetermined time period measured by a timer. If and only if the caller performs the interactive action during the predetermined time period as measured by the timer, additional video information is transmitted to the terminal of the caller from the server and displayed. A fee of the caller may optionally be reduced or increased depending on whether or not the interactive action is performed during the predetermined time period.

13 Claims, 2 Drawing Sheets

METHOD AND DEVICE FOR INCORPORATING ADVERTISING INTO VIDEOTELEPHONE COMMUNICATIONS

BACKGROUND OF THE INVENTION

The invention is directed to video telephony in which communication between two subscribers directly or between a plurality of subscribers using a multipoint control unit (MCU), as it is called, is made possible through the use of video telephone equipment or a video telephone and a voice telephone. In particular, the invention is directed to a video telephone method with user interaction.

A conventional standard for ISDN video telephony via two ISDN B-channels is given by H.320 which comprises the. standard components H.261 for video compression, G.711/G.722/G.728 for speech compression, H.221 for multiplexing, H.242 for signaling and T.100 for shared application, and a system description for video telephony.

Commercially available video telephone equipment enables video communications, and an acceptable image quality is achieved with the use of two ISDN B-channels. This results in higher charges compared to a voice telephone call or a video telephone call with lower quality via only one B-channel with a transmission rate of 64 Kbits/s. These increased charges must be absorbed solely by the video telephone user.

It is possible by means of conventional video telephone products, e.g., Telekom T-View 100, to call up information from a data server. Such information can be lotto numbers, weather forecasts or the like.

As concerns advertising within established media, direct interaction is not possible at the present time. Therefore, auxiliary means such as telephone campaigns, contests, membership drives, and so forth, are used instead. However, dissemination of interactive media is progressing; witness, PC "Video on Demand" with small-bandwidth backward channel. With interactivity of this kind, the media user is faced with the combination of primary useful information and secondary advertisement information.

Therefore, there exists on the part of advertisers and other information services an interest in inserting advertising or other information in a video telephone call to increase the revenues of the telephone network operator and/or to lower cost for telephone users. Moreover, providers of terminals, especially video telephones, can increase demand for this equipment by exploiting the encouraged telephony.

SUMMARY OF THE INVENTION

Therefore, it is the object of the invention to provide a method and a device for video telephony which makes it possible to fade in or insert such services during a video telephone call, wherein the interactivity should be an essential component.

According to the invention the method of video telephony for video and voice communication comprises the steps of:
a) controlling transmission of regular video information and voice information between terminals for video telephony of a caller and a called subscriber during a video telephone call by means of a server of a selected service provider;
b) starting a timer and then issuing a request from the server to the caller or the called subscriber to perform an interactive action;
c) testing whether or not the interactive action is performed by the caller or the called subscriber within a predetermined time period as measured by the timer; and
d) if and only if the interactive action is performed within the predetermined time period, transmitting additional video information to the terminal of the caller or the called subscriber from the server of the selected service provider and displaying the additional video information on the terminal of the caller or the called subscriber.

In preferred embodiments of this method a fee of the caller or the called subscriber is reduced, if the interactive action is performed during the predetermined time period so that the additional video information is received and displayed on the terminal of the caller or the called subscriber. Furthermore the fee of the caller or the called subscriber may be increased and a visual notification of the raising of the fee may be transmitted to the terminal of the caller or the called subscriber, if the interactive action is not performed during the predetermined time period so that the additional video information is not received and not displayed on the terminal of the caller or the called subscriber.

According to the invention the video telephony system for video and voice communication comprises a H.320 terminal for video telephony of a caller, a H.320 terminal for video telephony of a called subscriber, means for controlling transmission of regular video information and voice information between the H.320 terminals during a video telephone call in at least one H.320 server of a selected service provider, a timer comprising means for measuring or timing a predetermined time period, means for requesting the caller or the called subscriber to carry out an interactive action in the H.320 server; means for interrogating to determine if the interactive action has been performed during the predetermined time period as measured by the timer and means for transmitting additional video Information to the H.320 terminal of the caller or the called subscriber from the H.320 server and displaying it on the H.320 terminal of the caller or the called subscriber, if and only if the interactive action has been performed during the predetermined time period.

By using the method according to the invention, a video communications subscriber has the possibility of communicating at reduced charges or at no charge, for which purpose the subscriber selects a suitable service provider. This service provider connects the subscriber to the desired remote station and simultaneously transmits additional video information in the direction of the caller or in both directions, and the video telephone of the caller or called subscriber shows this information on the display. In this regard, additional video information is defined as video information not identical to the "regular" video information, that is, the video information generated by the video telephone. Additional video information can be, for example, advertising information or a provider's home page. For this purpose, the service provider has a special processing unit that can prepare or edit the video data stream and can insert advertising information into image data in the case of a video telephone call, or can utilize the video channel and display for the advertisement in the case of a simple voice telephone call.

The invention creates a further source of revenue for the service provider and offers the consumer a reduction in telephone rates, i.e., the cost of a telephone call can be partially or completely refunded by the advertisement carrier. Through the invention, the advertisement carrier obtains another channel for disseminating information.

The reduction in cost with the use of a video telephone, even when connected to pure voice telephone remote stations, can offset a higher purchase price without this being accomplished at the expense of the terminal manufacturer or network operator. Accordingly, the method according to the invention promotes further growth of the market for video telephones, which has been limited thus far, and consequently helps the manufacturers of video telephone equipment to increase sales.

The insertion of additional video information on the side of the caller can be carried out in different ways. It is possible for the additional video information to fill up the entire video screen of the caller or, as the case may be, also that of the called subscriber. In this case, the caller will not receive a picture of the called person as long as the additional video information, e.g., advertisement, is inserted. However, it is also possible for the additional video information to occupy only a part of the screen, for example, in the form of an inserted window. Further, the regular video information can take the form of a window arranged at any location on the screen, while the additional video information is the picture primarily displayed by the screen. Further, the window could be designed so as to be scalable within certain limits.

In particular, the owner of an H.320 terminal is advantageously capable of making a connection with a voice telephone subscriber via an H.320 server, wherein H.320 is an ISDN standard for video telephony. During the telephone conversation, the video telephone subscriber receives advertising videos from this server which cover or reduce the cost of the call. For example, interactive raffles, etc. can also be realized in the advertising video, in which the subscriber can possibly receive instant notification of a win.

In order to establish the presence or likely presence of a telephone user during the advertising presentation, the user should be motivated to actively participate through requests inserted into the advertisement. For this purpose, the user is offered a certain benefit, for example, a privilege, for active participation. For example, the user can occasionally be asked via video to actuate certain selection keys on his terminal that are randomly determined by the server in order to avail himself further of the low-cost telephone call; for this purpose, the user would be obliged to watch the entire advertisement presentation so as not to miss the individual requests to activate keys.

BRIEF DESCRIPTION OF THE DRAWING

The objects, features and advantages of the invention will now be described in more detail with the aid of the following description of a preferred embodiment with reference to the accompanying figures in which.

DESCRIPTION OF THE PREFERRED EMBODIMENT

Figure 1:
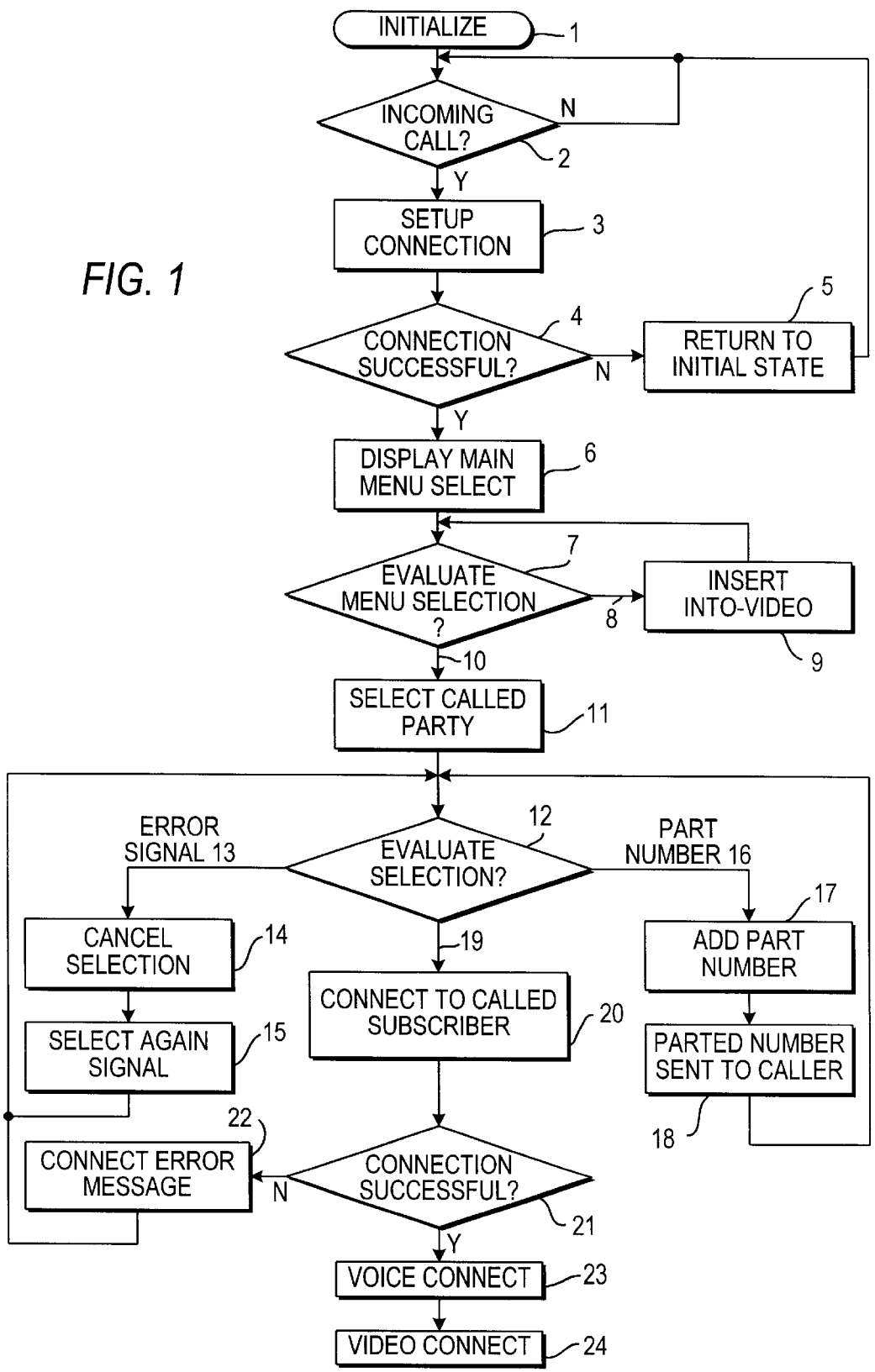
FIG. 1 is a flow chart of a server procedure for setting up a connection for a video telephone call.

In FIG. 1, the server is started in the first step 1 for initialization, although in practice it is always active. Therefore, step 1 is mentioned only for the sake of completeness. Step 2 interrogates whether there is an incoming call or an inquiry of a video telephone, in the present case an H.320 video telephone. If the answer is negative, designated by N in this example and in the following Figures, the system remains in the waiting loop. When an inquiry comes in, a connection setup of two ISDN B-channels is caused in step 3 in the affirmative case, designated here and in the following by J. Subsequently, step 4 interrogates whether the connection setup was successful. If not, then in step 5, which produces the starting state, the system goes back to the waiting loop of step 2. If the connection setup was successful, the main menu is inserted in step 6, possibly with a musical greeting. The caller selects the desired action from the main menu. The selection is evaluated in step 7. An info-inquiry 8 can be initiated, so that an info-video containing, e.g., operating instructions, is played and inserted in step 9. When the evaluation of the menu selection gives the process "Select" 10, the selection menu for selecting the called subscriber is sent in step 11. There follows a new evaluation step 12 for evaluating the selection information. When there is an input error 13, the entry is canceled in step 14 and the start image is transmitted to the caller in step 15, so that the system is again ready for evaluation step 12. With a numerical input 16, the system adds the entered number in step 17 to the part of the telephone number already entered. In step 18, the picture, i.e., the part that is already entered or the complete telephone number, is transmitted to the terminal of the caller. If the menu selection gives the "Connect" 19 action, the connection is made with the other subscriber, that is, the called subscriber, in step 20. This is followed by an inquiry 21 which determines whether the setup was successful. If not (N), an error message is sent to the caller in step 22. With a successful connection setup, i.e., if J, the voice connection between the subscribers is made in step 23. The system is then in a state 24 in which the video and voice telephony are connected via the server and active.

Figure 2:
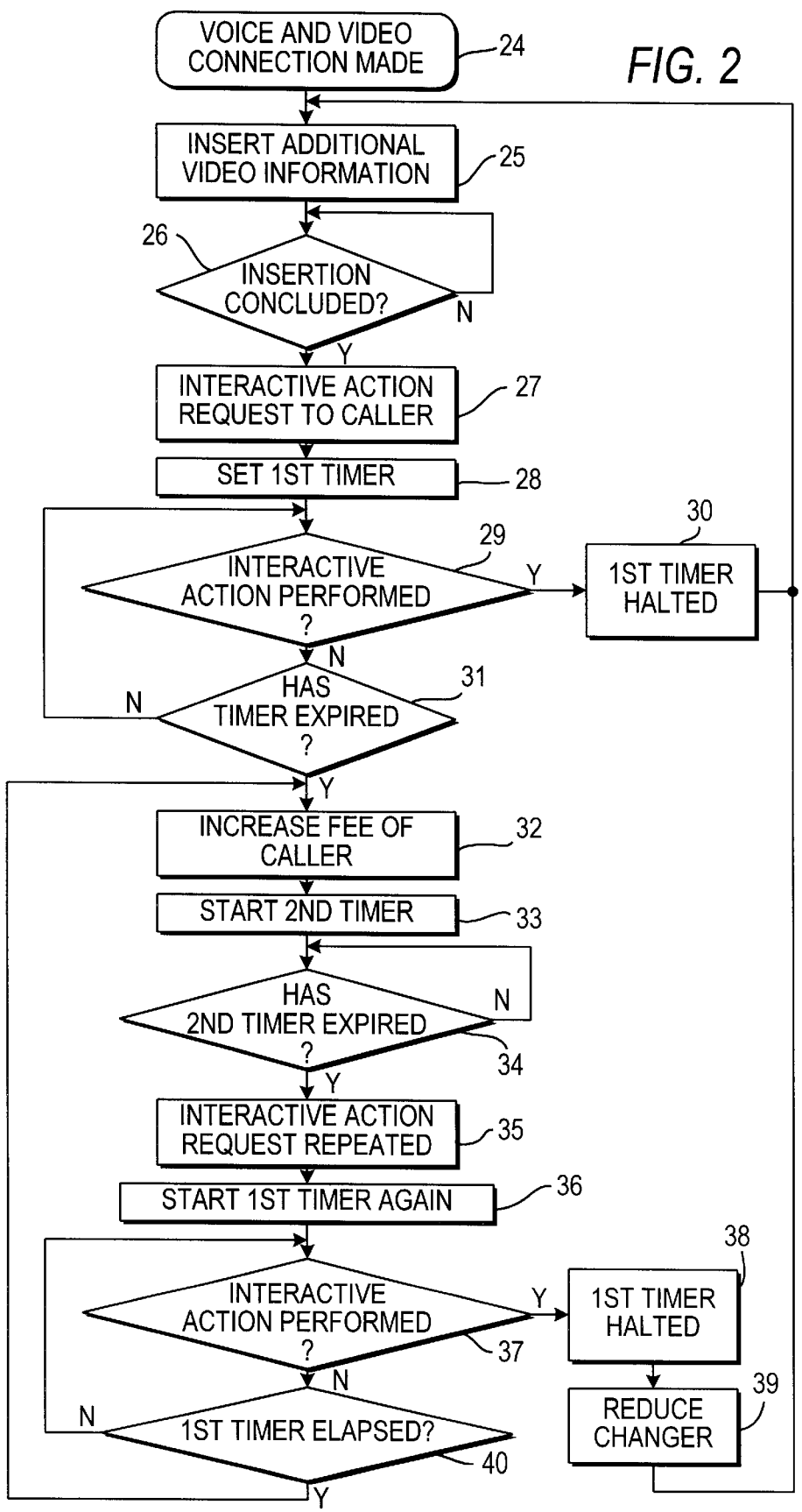
FIG. 2 is a flow chart of a preferred method according to the invention for video telephony for video and voice communication, in which additional video information is displayed to the subscriber when an interactive action is performed by the subscriber during a predetermined time interval in order to obtain a fee reduction or prevent a fee increase.

FIG. 2 shows the conversation part of a video telephone call according to the invention after the video and voice connection is connected via the server, i.e., the system is in state 24. The transmission of additional video information is carried out, for example, an advertising video, differing from the regular video information, i.e., the video information transmitted by another subscriber, is carried out in step 25. The form of insertion, i.e., whether the additional video information is inserted in the form of a window or whether it is the only image visible or whether the regular picture in window form is inserted in addition, is correspondingly determined. The voice connection with the called subscriber is maintained. Further, the inserted additional video information is normally visible only to the caller and the called subscriber sees the image of the caller via video telephone. It is inquired in a waiting loop 26 whether the insertion has been concluded. If yes (J), the video telephone subscriber is requested visually in step 27 to carry out an action determined by the server, for example, entering a random number determined by the server. A first timer I is started in step 28. In a waiting loop 29, it is inquired whether the action to be carried out by the subscriber has taken place. If yes (J), the first timer I is stopped in step 30 and the system transmits new additional video information, i.e., a new advertising video. If nothing has been entered, i.e., output N of inquiry 29, it is inquired in step 31 whether or not the first timer I has elapsed. If not (N), the system goes back to inquiry 29. If the timer I has expired (J), a fee increase is carried out in step 32 and the subscriber is notified visually. In step 33, a second timer II is started. In a waiting loop 34, it is inquired whether the second timer II has expired. If yes (J), the subscriber is again visually requested in step 35 to carry out an action determined by the server, for example, entering a new random number determined by the server.

Subsequently, the first timer I is started again in step 36. It is inquired in inquiry 37 whether an input has been entered by the subscriber, i.e., whether the subscriber has carried out the action selected by the server. If an input has been entered (J), the first timer I is stopped in step 38 and charges are cleared or reduced in step 39 and the system returns to step 25 and transmits a new video, i.e., new additional video information. On the other hand, if nothing was entered (N), it is determined in inquiry 40 whether the first timer I has elapsed. If not (N), the system is in a waiting loop, i.e., it goes back to inquiry 37. If yes (J), i.e., the first timer I has elapsed, the system returns to step 32 and carries out an increase in charges.

What is claimed is:

1. A method of video telephony for video and voice communication, said method comprising the steps of:
   a) controlling transmission of regular video information and voice information between terminals for video telephony of a caller and a called subscriber during a video telephone call by means of a server of a selected service provider;
   b) starting a timer and then issuing a request from the server to the caller or the called subscriber to perform an interactive action;
   c) testing whether or not said interactive action is performed within a predetermined time period as measured by said timer; and
   d) if and only if said interactive action is performed within said predetermined time period, transmitting additional video information to the terminal of the caller from the server of the selected service provider and displaying said additional video information on the terminal of the caller.

2. The method as defined in claim 1, further comprising reducing a fee of said caller, if said interactive action is performed during said predetermined time period so that said additional video information is received and displayed on said terminal of the caller.

3. The method as defined in claim 1, further comprising raising a fee of said caller and supplying a visual notification of the raising of said fee of the caller, if said interactive action is not performed during said predetermined time period so that said additional video information is not receive and not displayed on said terminal of the caller.

4. The method as defined in claim 3, further comprising starting another timer when said video telephone call is started, halting said another timer after another predetermined time period measured by said another timer has expired, after expiration of said another predetermined time period again requesting said caller to perform said interactive action, then again starting said timer and testing again whether or not said interactive action is performed during said predetermined time period as measured by said timer and displaying said additional video information and lowering said fee if and only if said interactive action is performed during said predetermined time period.

5. The method as defined in claim 1, wherein said additional video information completely covers a screen of the terminal of the caller and said regular video information and voice information are provided in a window on said screen.

6. The method as defined in claim 1, wherein said additional video information is provided in a window displayed on a screen of the terminal of the caller.

7. The method as defined in claim 1, wherein said interactive action consists in entering a random number generated in said server.

8. The method as defined in claim 1, wherein said additional video information is an advertising video.

9. The method as defined in claim 1, wherein transmission of said additional video information is carried out in a direction of the caller.

10. The method as defined in claim 1, wherein said server is an H.320 server and at least one of said terminals is an H.320 terminal.

11. A video telephony system for video and voice communication, said video telephony system comprising
   a H.320 terminal for video telephony of a caller and a H.320 terminal for video telephony of a called subscriber;
   means for controlling transmission of regular video information and voice information between said H.320 terminals of said caller and said called subscriber during a video telephone call in at least one H.320 server of a selected service provider;
   a timer comprising means for measuring or timing a predetermined time period;
   means for requesting the caller to carry out an interactive action in said H.320 server;
   means for interrogating to determine if said interactive action has been performed during said predetermined time period as measured by said timer; and
   means for transmitting additional video information to the H.320 terminal of the caller from the H.320 server and displaying said additional video information on the said H.320 terminal of the caller, if and only if said interactive action has been performed by the caller during said predetermined time period.

12. The video telephony system as defined in claim 11, further comprising means for reducing a fee of said caller if said interactive action is performed during said predetermined time period, so that said additional video information is received and displayed on the said H.320 terminal of the caller.

13. The video telephony system as defined in claim 11, further comprising means for increasing a fee of said caller if said interactive action is not performed during said predetermined time period, so that said additional video information is received and not displayed on said H.320 terminal of the caller.

* * * * *